United States Patent

Boucher et al.

[11] 3,957,230
[45] May 18, 1976

[54] REMOTELY CONTROLLED ELECTRIC AIRPLANE

[76] Inventors: Roland A. Boucher, 5104 W. 58th Place, Los Angeles, Calif. 90062; Robert J. Boucher, 2301 Cheryl Place, Los Angeles, Calif. 90049

[22] Filed: Mar. 10, 1975

[21] Appl. No.: 556,674

Related U.S. Application Data

[63] Continuation of Ser. No. 383,689, July 30, 1973, abandoned.

[52] U.S. Cl. ............................. 244/53 R; 46/78; 46/249; 244/57; 244/190
[51] Int. Cl.² ................... B64D 27/24; B64D 33/08
[58] Field of Search.............. 46/76 R, 78, 243, 244; 320/37, 15; 323/22 Z; 318/16; 310/67 R, 60 R, 61; 244/3.14, 53 R, 53 B, 58, 60, 77 C, 57

[56] References Cited
UNITED STATES PATENTS

| | | | |
|---|---|---|---|
| 2,368,630 | 2/1945 | Bizjak | 244/58 |
| 2,372,250 | 3/1945 | Burnelli | 244/53 R |
| 2,680,578 | 6/1954 | Katz | 244/77 C |
| 3,002,118 | 9/1961 | Papst | 310/67 R |
| 3,089,970 | 5/1963 | Rhodes | 310/60 R |
| 3,210,028 | 10/1965 | Sproull | 244/77 C |
| 3,217,225 | 11/1965 | Gottlieb | 320/37 |
| 3,292,304 | 12/1966 | Wolfe | 46/244 A |
| 3,546,811 | 12/1970 | Kupperman et al. | 46/243 AV |
| 3,558,943 | 1/1971 | Nilsson | 310/61 |
| 3,629,680 | 12/1971 | Bagnes | 46/244 R |
| 3,699,708 | 10/1972 | Mabuchi | 46/243 AV |
| 3,742,507 | 6/1973 | Pirre | 46/244 B |

OTHER PUBLICATIONS

G. L. Mattson, RMS Voltage Regulator, IBM Tech. Bul., Aug. 1966, p. 336, Vol. 9, No. 3.

*Primary Examiner*—Trygve M. Blix
*Assistant Examiner*—Galen L. Barefoot

[57] ABSTRACT

An airplane with an electric motor and rechargable battery pack are disclosed herein. The electric motor is of the high performance variety (i.e., it has a very high power rating for its size and weight). Means are provided for producing a high velocity blast of cooling air directly onto the rotating armature for rapidly dissipating the waste heat generated inside of the motor. Means are also provided for obtaining a large power output from the battery pack and for very rapidly recharging the battery pack. A remote control system is included for controlling the operation of the airplane from a remote location.

13 Claims, 7 Drawing Figures

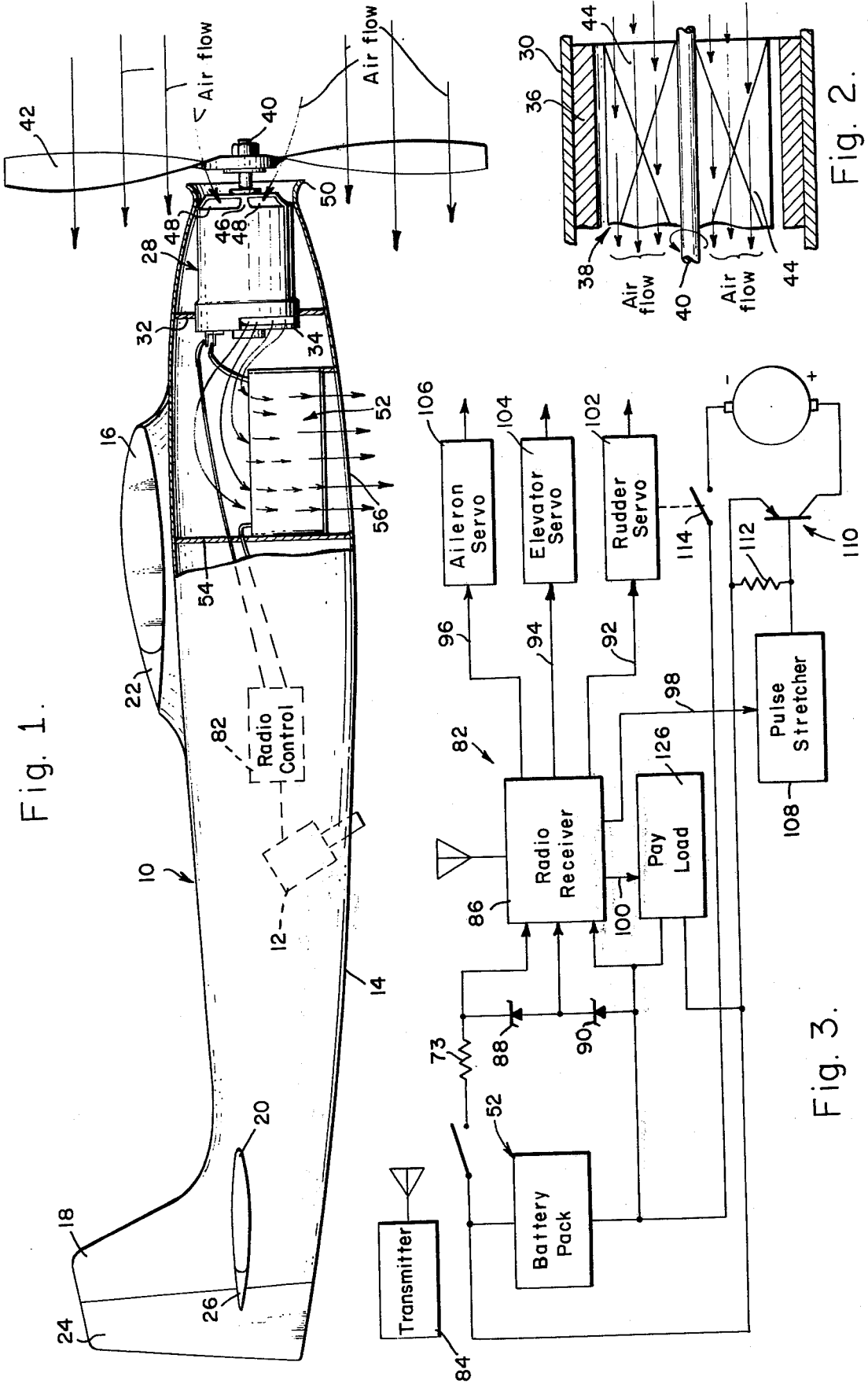

REMOTELY CONTROLLED ELECTRIC AIRPLANE

RELATED APPLICATIONS

This application is a continuation of co-pending application Ser. No. 383,689 entitled "Remotely Controlled Electric Airplane" and filed July 30, 1973, now abandoned, in the names of Roland A. Boucher and Robert J. Boucher.

BACKGROUND

There are many uses for small or even intermediate size unmanned aircraft for performing various types services. Some of these aircraft are preprogrammed to fly a predetermined course and/or they are remotely controlled by radio, etc. An example of this type of aircraft are drones, remotely piloted vehicles for taking photographs, etc. Also it is common now adays to employ model aircraft for training and/or amusement purposes.

Heretofore, it has been customary to use a gasoline engine for driving such airplane. Although such engines are highly developed and reasonably reliable, they do require a considerable amount of servicing and maintenance. This is particularly true with engines having relatively low power ratings for example on the order of 5 or 10 horsepower or less and especially so called fractional horsepower engines. In addition, they also require a considerable amount of special equipment and supplies such as messy gasolines, oils, batteries, etc. Moreover, the gasoline engines are extremely noisy whereby their operation has been banned in many areas.

SUMMARY

The present inventor provides means for overcoming the foregoing difficulties. More particularly, the present invention provides an airplane which uses an electric motor as its driving source. The motor includes means for maintaining its temperature at a low level whereby the motor can produce large amounts of power for its size and weight. In addition, means are provided for obtaining a large amount of power from a small size, light weight battery pack and for recharging the battery pack at a high rate in a very short period of time.

DRAWINGS

FIG. 1 is a side view of an airplane, a position thereof being broken away, utilizing a battery driven electric motor and emboding one form of the present motor.

FIG. 2 is a fragmentary cross sectional view on an enlarged scale of the motor in the airplane of FIG. 1.

FIG. 3 is a block diagram of the control systems embodied in the airplane of FIG. 1.

DESCRIPTION

Figure 4:
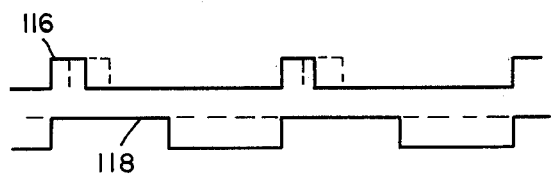
FIG. 4 is a set of waveform present in the throttle control portion of the control system in FIG. 2.

Referring to the drawings in more detail and particular to FIG. 1, the present inventor is particularly adapted to be embodied in an airplane 10. The airplane 10 may be of any desired variety and used for any desired purpose. By way of example, the airplane 10 may be a small scale model which is flown for amusement purposes or it may be a pilotless aircraft or drone which is used for any desired variety of purposes.

In the present instance the airplane 10 is of the so called remotely piloted vehicle variety suitable for flying various types of reconiscense or survielance missions. It is equipped with a suitable pay load such as a television camera 12 for taking pictures of the ground and relaying them back to the operator. Of course it should be understood that other types of equipment such as scientific instruments, etc. may be carried on the aircraft 10. Alternatively, the aircraft 10 may merely be a small model aircraft used for amusement and/or training purposes.

The present aircraft 10 is of a generally conventional design and includes a fuselage or body 14, a pair of wings 16, a vertical tail fin 18 and horizontal stabalizers 20. Depending upon the intended use of the aircraft 10, one or more of the foregoing may be provided with movable control surfaces. More particularly in the present instance, the wings 16 include ailerons 22, the tail fin 18 includes a rudder 24 and the stabilizers 20 include elevators 26. These control surfaces 22, 24 and 26 are effective to respectively cause the aircraft 10 to roll, to turn and to climb or dive.

The airplane 10 is propelled through the air by means of an electric motor 28. Although a more or less conventional electric motor may be used, it has been found that because of the normally critical weight limitations, the motor 28 should preferably be of a light weight, high performance variety.

In the present instance, the motor 28 is of the so called permanent magnet variety and may be made to run in either direction. It includes an outer casing 30 which is of a generally cylindrical shape. This casing 30 is adapted to be rigidly secured to the aircraft 10 in a fixed position by any suitable means. By way of example in this embodiment it is mounted on a bulkhead or firewall. The rear end 34 of the motor 28 projects slightly through the bulkhead 32. The casing 30 of the motor 28 should be fastened by means sufficiently strong to withstand the torque from the motor 28 and the usual shocks, impacts, etc. encountered during normal operation. At the same time, it is highly desirable for the motor 28 to be easily removable for servicing replacement.

A permanent magnet assembly 36 is mounted on the inside of the casing 30. The magnet assembly 36 forms one or more pairs of opposed pole faces. These faces are of a cylindrical shape so as to form a cylindrical passage axially through the motor 28.

An armature 38 is mounted on a drive shaft 40. The drive shaft 40 extends beyond the ends of the armature 38 whereby it may be supported on ball bearings which are attached to the casing 30. In addition, one end of the drive shaft 40 extends a substantial distance from the motor 28. It projects from the front of the airplane 10 whereby a propeller 42 may be attached thereto.

The armature 38 includes a core with one or more pairs of arms which projects radially from the shaft 40 so as to form accurate pole faces. These pole faces are disposed adjacent to the pole faces of the permanent magnet 36. The faces on the armeture and the permanent magnet are separated from each other by a small clearance space or air gap. As a result the armeture 38 can freely rotate within the casing 30 at a very high speed.

An electric coil 44 is wound upon the armeture 38 for producing a magnetic field. This field reacts which the field from the magnet 36 to produce the torque for driving the armeture.

The coil 44 is usually wound upon the radial arms of the armeture core. This leaves a substantial amount of open space in and around the armeture 38. More particularly there are large openings between the coils. These openings extend axially off the armeture 38 and are filled with air.

The opposite ends of the casing 30 are preferably open to the atmosphere whereby the air can flow from the atmosphere through the open end of the casing, in and around the armeture 38 and out the other end of the casing 30.

More particularly, it may be seen that the front of the motor 28 includes a "spider" 46 for supporting the front ball bearing. This in turn leaves several large openings 48 which extend into the interior of the motor 28. In addition, the rear end of the motor 28 also includes several large openings through which air may flow. It may thus be seen air may easily flow through the openings 48 on the front of the motor 28, axially through the motor 28 and around the armeture 38 and be discharged from the rear of the motor 28 and into the space behind the fire wall 32.

A propeller 42 is mounted on the exposed end of the driveshaft 40 whereby it is driven directly by the motor 28. The motor 28 is preferrably mounted on the airplane 10 so as to position the propeller 42 in the atmosphere whereby the propeller 42 is free to propel the airplane 10 through the atmosphere. In the present instance, by way of example, the motor 28 is mounted on the front of the airplane 10. However, it should be understood it can be mounted anywhere that is convenient. For example, if a pair of motors are being used, they could be mounted on the wings, etc. In addition the motor or motors may be arranged in a so called "pusher type" of configuration.

It may seem that the open end of the casing 30 is disposed at the front of the aircraft 10 and directly aligned with the direction of travel. Thus, the airplane 10 travels through the atmosphere, the air will flow through the interior of the motor 28.

In addition, the open end of the casing 30 is directly aligned with at least a portion of the blast of air from the propeller 42. As a consequence, the propeller 42 will force a large volume of air axially through the motor 28. If desired a somewhat enlarged cowling or scoop 50 may be provided on the front of the fuselage 14. This is effective to increase the volume of air forced through the motor 28.

It can be appreciated that the cool atmospheric air is flowing axially through the motor 28. It is also flowing through the space wherein the armeture 38 is rotating. Because of the high velocity of the blast from the propeller 42 and the turbulence produced by the high speed rotation of the armeture 38, there is an intimate heat exchanging relationship between the armeture 38 and the cooling air. As a consequence, a large amount of heat is rapidly absorbed out of the armeture 38.

It should be noted that virtually all of the heat generated in a permet magnet motor is generated by the current flow in the coil 44 on the armeture 38. Since a large volume of cool air is forced directly against this coil 44 and other parts of the armeture 38, the waste heat is most effectively dissipated directly from the coil 44 without its having to flow outwardly through the stator, outer casing 30, etc. As a result, there is not a localized concentration of heat which can cause a large build-up in temperature.

Because the heat is effectively dissipated at a high rate from its original source, the motor 28 can be driven at a much higher power level than is otherwise possible. In fact, it has been found that designing the electric motor 28 to force the air to flow through and around the armeture 38 and by directing a portion of the prop wash through the motor 28 and around the armeture 38 the motor 28 may be operated at a load level considerable in excess of ten times its original rating. In other words, the weight of the motor 28 for a given power rating may be reduced by roughly 90%. Such a dramatic reduction in weight is, of course, extremely important in an airplane.

The motor 28 is driven by a suitable source of electric power. In the present instance, this is accomplished by means of a battery pack 52 which is mounted in and carried by the airplane 10. Although any suitable type of batteries may be employed, it is desirable for the battery pack 52 to be of a high performance variety. That is, the battery pack 52 should be capable of producing large amounts of power for reasonably extended periods of time, while having as little weight as possible. The batteries should also be suitable for use in the type of environment normally encountered in an aircraft, i.e., inverted flight, vibration, shock, etc. It is also highly desirable for the battery pack to be rechargable.

One type of battery pack 52 which satisfies all of these requirements and has been found satisfactory, is the variety which employs one or more nickel cadmium cells. Nickel cadmium cells can store a large amount of energy in a relatively small size and weight. Also, it is possible to draw a very large current from them and discharge them at a high rate without causing any serious damage to the cells.

However, as the individual nickel cadmium cells are discharged, each one generates waste heat. The rate at which the heat is generated is a function of the discharge rate, i.e., the amount of current flow. If the discharge rate is very high and the heat is generated faster than it is being dissipated, the temperature of the cell will rise far about the ambient temperature. Fairly substantial rises in temperatures can be tolerated. However, if the temperature rises too much, a substantial pressure builds up inside the cell. This build up in temperature and pressure reduces the performance of the battery pack 52 i.e., the voltage drops etc. Moreover, if the pressure build-up is uncontrolled, it can cause the individual cells to explode and destroy themselves. Such a catostrophic failure at the very least will damage the aircraft 10 and may even injure any persons in the vicinity.

In order to increase the rate at which the battery pack 52 can be safely discharged, the individual cells are disposed in a case having ventilating openings for the flow of air.

In addition the battery pack 52 is disposed immediately behind the firewall 32 so as to be in line with the blast of air discharged from the rear 34 of the motor 28.

A second bulkhead 54 is disposed immediately behind the battery 52. This is effective to prevent the flow of air into the rear of the airplane 10.

An enlarged opening 56 or series of smaller openings may be provided in the bottom of the fuselage 14. As a consequence, the air flowing through the motor 28 is trapped in the sealed space above the battery pack 52. The air is thereby forced to flow downwardly through the battery pack 52 and into intimate heat exchanging relation with each of the individual cells in the pack. The air is then discharged through the opening 56 in the bottom of the aircraft 10 and returned to the atmosphere.

It will be seen that this arrangement insures a forced draft of air through the battery pack 52 in intimate heat exchanging relations with the individual cells. Thus whenever a heavy discharge current is being drawn from the battery pack 52 (i.e. the motor 28 is running), a flow of cooling air is always circulated across the individual cells.

The charging of the battery pack 52 presents a somewhat similar type of problem. The nickel cadmium cells can be rapidly charged. However, as they are charged, they produce heat with a resultant build-up in pressure. If the charge rate is so high the heat builds up faster than it is being discharged, the temperature will rise.

If this heat is not dissipated from the battery pack 52 at an adequate rate, the temperature of one or more of the cells may rise to an excessive level. This, in turn, can cause the individual cells to explode.

In addition, if the cells are overcharged, they can be damaged. As a cell becomes overcharged, its voltage and/or its internal resistance reduces. The greater the amount of overcharge, the greater the rate at which the voltage and resistance decrease. Under these circumstances, if the cell is being charged from a constant voltage source once the cell if fully charged and its voltage and resistance begin to decrease, the charging rate begins to increase. This, of course, results in a snowballing effect that will destroy the cell.

This type of a problem is particularly acute where the airplane 10 is operating out of a remote location where complicated charging equipment, accurately regulated voltage sources, etc. are not available. For example, if the airplane 10 is a small model operating from a vacant field, etc., there is not a regular power source available. Accordingly, if the battery pack 52 is going to be recharged, it is customary to use a portable power source. Heretofore, it has been customary to employ a "trickle" charger which charges the battery at a very slow rate. This, of course, required a long time to charge the battery pack.

Alternatively, it has been possible to completely discharge the battery down to ground level. This insures the charging process starting from a known reference level. Thus if a predetermined charge is fed to the battery pack, it should be fully charged. This avoids the problem of overcharging an already partially charged battery pack. Theoretically, this then permits the known charge being fed into the battery pack at a relatively high rate whereby the charging time is relatively short. However, if the battery pack was completely discharged just prior to the charging operation, the battery will be hot and the rapid charge will cause it to overheat and fail.

Figure 5:
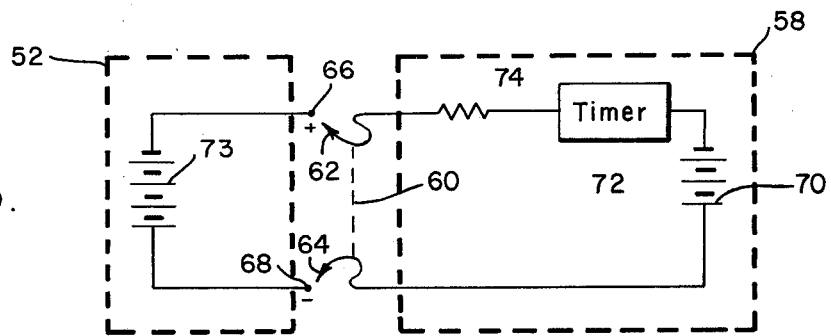
FIG. 5 is a wiring diagram of a battery charging circuit for use in recharging the battery power supply in the airplane.
Figure 6:
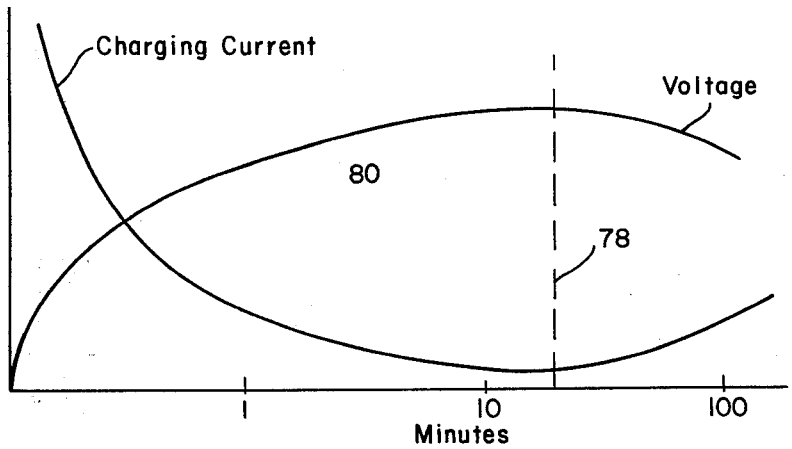
FIG. 6 is a graph illustrating the operating characteristics of the battery charger of FIG. 4.

The present battery charger 58 which is best seen in FIGS. 4 and 5, may be used. This charger 58 includes a connector 60 having a pair of contacts 62–64 which are adopted to mate directly with a pair of complimentary contacts 66–68 on the side of the aircraft 10. If the battery switch in the aircraft is moved from the operating or running position to the charge position, the charger 58 will be connected directly to the battery pack 52 and the motor 28 will be disconnected.

The charger 58 includes an electric energy source such as a rechargable lead acid wet cell battery 70. By way of example, this may be a battery out of an automotive vehicle, motorcycle, etc.

A timer 72 and a regulating or limiting resistor 74 are connected in series with the storage battery 70 and the contacts 62–64. The value of the resistor 74 may vary over a fairly wide range. As will be explained in more detail subsequently, it has been found preferable for the resistor 74 to be approximately equal to the internal resistance of the battery pack 52. This allows a very rapid charging rate with little or no danger of damaging any of the nickel cadmium cells in the battery pack 52.

The voltage of the charging source (i.e., the battery 70), may also vary over a considerable range. However, it is preferable equal to or just a little greater than the fully charged voltage on the battery pack 52. Normally, the back voltage on a nickel cadmium cell as it is being charged is about 1.5 volts or a little less when it reaches the fully charged level. The voltage on a lead acid, wet cell is about 2.0 volts or a little more. Therefore, if there are four nickel cadmium cells in series with each other, they will have a voltage equal to or slightly less than the voltage from three lead acid cells.

It has been found the foregoing ratio of cells is ideally suited for this purpose. More particularly, if a 6-volt system is being used to run the motor 28, the battery pack 52 will include four cells and the energy source battery will include three cells. Similarly in a 12, 18, or 24 volt system, the battery pack 52 will have eight, 12 or 16 cells while the energy source will have six, nine or 12 cells, respectively. It should also be understood that the cells may be arranged in various series and parallel configurations to preserve these ratios for any set of operating voltages.

The charging characteristics of the battery pack 52 and charger 58 are best seen in FIG. 5. If the battery pack 52 is completely discharged down to ground level, it will correspond to the left-hand vertical line 76 and the voltage will be zero or ground. As a consequence, when a fully discharged battery is connected to the charger 58, there is initially a "very high" current surge. The amount of this current is limited by the resistor 74 and the internal resistances of the battery pack 52 and the energy source battery 70.

As the battery pack 52 begins to charge, the voltage on the pack 52 very rapidly builds up to some predetermined intermediate level. Depending on the characteristics of the individual nickel cadmium cells 73 and the parameters of the system, this may take about 15 to 45 seconds. Thereafter, the voltage rises more slowly and linearly as the charge increases.

At the same time, the current follows a somewhat inverse function. More particularly, the current gradually decreases. This results in the "charging rate" decreasing correspondingly. "Charging rate" as used herein, means the amount of time that would be required to fully charge a discharged battery if the current remained constant at that level.

When the battery pack 52 is fully charged (as indicated by the broken vertical line 78 in FIG. 5) the voltage on the battery pack 52 will reach a maximum level. This is the rated voltage of the battery pack 52. At this point, the charging rate is at a minimum level. By way of example, this rate may be at a level of about 3 hours or more. In other words, if the current remained constant at this amount, it would require about 3 hours or more for the battery pack 52 to go from the fully discharged condition to the fully charged condition.

If the charger 58 continues to charge the battery pack 52 beyond its fully charged condition, the voltage on the battery pack 52 will gradually decrease from its rated level. At the same time, the current and therefore the charging rate will increase. As this overcharging continues, the voltage continues to drop at an ever-accelerating rate whereby the charging rate begins to increase at an ever-accelerating rate. As a consequence, if this overcharging is allowed to persist for an excessive time, it will reach a rate where the battery pack 52 will be destroyed.

However, since the limiting resistor 74 reduces the current flow to a very low level at the fully charged condition, any overcharging is initially very limited. It will take a considerable amount of time before the charging rate builds up to a dangerous level. More particularly, the current limiting and voltage dropping resistor 74 will allow the charging rate to initially be very high. For example, initially the charging rate may be on the order of 2 or 3 minutes. However, within a matter of 15 to 45 seconds the charging rate is reduced to about 5 minutes or so. Although this may be a very high charging rate, the battery pack 52 is initially at ambient temperature. As a consequence, the heat produced will not cause an excessive rise in temperature. Thereafter the charging rate is gradually reduced as the battery pack 52 reaches full charge. At full charge, the charging rate is normally as low as two or three hours. With an arrangement of this nature it normally takes about 10 to 15 minutes for the battery pack 52 to reach full charge.

Accordingly, the timer 72 is normally set for about this interval of time or slightly less. It will be seen that if the battery pack 52 is fully discharged when it is first connected to the charger 58, it will reach full charge in an interval of about 10 to 15 minutes. At this point, the timer 72 shuts the charger 58 "OFF" and no further charging occurs. Accordingly, there is no danger of damaging the battery pack 52 by overcharging.

If the battery pack 52 is initially about half discharged when it is coupled to the charger 58, the voltage will be at about the point 80. If the timer 72 is turned "ON", the initial charging rate will be about 5 minutes. If the timer 72 is allowed to run for its full interval before it turns "OFF" (i.e., 10 or 15 minutes), there is a possibility of the battery pack 52 becoming somewhat overcharged.

However, at full charge, the charging rate is very low, i.e., 3 hours or longer. As a consequence, even though the timer 72 may allow the charger 58 to run beyond the time full charge line 78, for example, 5 minutes or so, the actual amount of overcharging will be very little and there will be no damage to the battery pack 52.

Normally, it is known when a battery pack 52 has been fully charged. As a result, there is little chance of charging a fully charged battery pack 52 a second time. However, even if the charger 58 is connected to a fully charged battery pack 52, the charging rate will still remain at a sufficiently low level to eliminate any significant damage to the battery pack 52.

It will thus be seen that by a proper balancing of the resistor 74 against the voltages and resistances of the battery pack 52 and the energy source battery 70 and the selection of the appropriate time interval, the battery pack 52 can be fully charged in a very short increment of time. Also irrespective of the original charge of the battery pack 52, there is little or no danger of damaging the battery pack 52 by over charging.

Once the battery pack 52 is fully charged, the airplane 10 is ready to fly. The airplane 10 may be of the so-called "free flight" variety. Such an airplane 10 is normally launched and allowed to operate on a random chance or pre-programmed basis.

However, in the present instance, the airplane 10 is remotely controlled by means of a radio control system 82. In such a system 82, the operator utilizes a radio transmitter 84 for transmitting command signals. A radio receiver 86 is carried on board the airplane 10. This receiver 86 is responsive to the command signals for operating the various control surfaces 22, 24 and 26, etc.

Although the receiver 86 may have its own power source (i.e., separate set of batteries), in the present instance, it is coupled to the battery pack 52. It may be noted that the voltage of the battery pack 52 tends to decrease as the cells therein become discharged. In addition, the voltage may tend to fluctuate as the load varies. Accordingly, it is desirable to regulate the voltage for the receiver 86. In the present embodiment, this is accomplished by means of a dropping resistor 73 and a pair of Zenner diodes 88 and 90. This is effective to provide a plurality of voltages, each of which is accurately controlled.

The transmitter 84 and/or receiver 86 may include one or more channels for controlling one or more functions on the aircraft 10. By way of example, the present system 82 includes a first channel 92 for controlling the positive of the rudder 24, a second channel 94 for controlling the position of the elevator 26, a third channel 96 for controlling the positive of the ailerons 22 and a fourth channel 98 for controlling the speed of the motor 28. If desired, one or more additional channels 100 may be used for controlling the operation of the payload, i.e., TV camera 12, etc.

The operation of the various channels 92 to 100 and the functions they perform are controlled by the operator manually manipulating one or more of the controls on the transmitter 84. This first three channels 92, 94 and 96 include some form of a mechanism such as servos 102, 104 and 106. Each one of these servos 102, 104 and 106 is responsive to an appropriate command signal and effective to mechanically move the corresponding control surface to the desired position.

The fourth, or throttle control channel 98 includes a pulse stretcher 108 which is coupled to the output of the receiver 86. The receiver 86 produces a series of throttle or control pulses 116 as explained more fully in connection with FIG. 3. The output of the pulse stretcher 108 is coupled to the base of a transistor 110. The emitter of the transistor 110 is coupled to one side of the battery pack 52 (i.e., the positive side in the present instance). A biasing resistor 112 may be provided between the emitter and the base.

The collector is, in turn, connected to one of the brushes on the motor 28 while the other brush is connected to the opposite side of the battery pack 52. If desired, a make-break switch 114 may be provided in a lead to the motor 28.

The transmitter 84 causes the throttle channel 98 to feed a series of pulses 116 to the pulse stretcher 108. At a minimum throttle setting the pulse 116 will be shortest. By way of example, the pulse 116 may have a duty cycle of about 5%. At full throttle setting, the pulse 116 may have a duty cycle of about 10% or 15%.

When the control pulses 116 are coupled to the pulse stretcher 108, the stretcher 108 produces a series of square wave switching pulses 118. These switching pulses 118 commence substantially simultaneously with the control pulses 116. Each of the switching pulse 118 lasts for a period of time which is a function of the duration of the control pulse 116. For example, if the control pulse 116 is "ON" for a minimum period of time (i.e., 5%), the switching pulse 118 will have a minimum duration or may not even occur. As the duration of the control pulse 116 increases, the duration of the switching pulse 118 increases. When the control pulses 116 last beyond some predetermined maximum (i.e., 10% or 15%), then the switching pulses 118 are "ON" 100% of the time.

The switching pulses 118 are applied to the base of the transistor 110. Each pulse is effective to turn the transistor 110 "ON" for as long as the switching pulses 118 last. When a switching pulse 118 terminates, the transistor 110 is biased "OFF" and no longer conducts.

It may thus be seen that the transistor 110 acts as a switch and is effective to turn "ON" and "OFF" in synchronism with the control pulses 116. As a consequence, as the transmitter 84 causes the duration of the control pulses 116 to vary, the amount of the transistor 110 conducts also varies. This, in turn, is effective to vary the amount of power that is coupled to the motor 28.

The foregoing throttle control system is very effective to control the speed of the motor 28. However, under some circumstances, it is highly desirable to be able to completely stop the motor 28. For example, it may be desirable to have the airplane 10 glide with the motor 28 completely "OFF". To accomplish this, a switch 114 may be provided in a lead to the motor 28.

The switch 114 is mechanically coupled to one of the control mechanisms such as for the rudder 24. During its normal excursions, the rudder 24 will not in any way effect the switch 114. However, when the rudder 24 is moved to one of its extreme positions, it will mechanically engage the switch 114 and move it to the "OPEN" position. The rudder 24 may, then, be quickly returned to its normal positions for continued steering of the airplane 10. However, once the switch 114 has been moved to the "OPEN" position, it will remain "OPEN" and the motor 28 will remain completely shut "OFF" until it is again manually reset. Alternatively, the switch 114 may be arranged such that moving the rudder 24 to its other extreme position will again move the switch to the "CLOSED" position.

It may be appreciated that if desired the radio receiver 86 may be of a very simple variety such as a two channel receiver. Such a receiver is effective to control only two functions such as just the rudder and elevator. By using the switch 114 coupled to the rudder, it is possible to turn the motor 28 "OFF" without having a separate additional channel. In other words, this will permit eliminating a throttle control channel while still allowing the motor 28 to be turned "ON" and "OFF".

Since the motor 28 is of the ballbearing variety when it is shut "OFF" it will "windmill" while the airplane 10 is gliding, i.e., the propeller 42 and the motor 28 will continue to rotate from the wind thereon. This is, of course, presents less drag than a stationary propeller and thereby improves the glide qualities of the airplane 10.

As an alternative, provision may be made to "shortout" the motor 28 whereby it presents a greater drag for braking purposes. Also since the motor 28 is reversible, it may be run backwards to produce a very large reverse thrust for braking the airplane 10.

Figure 7:
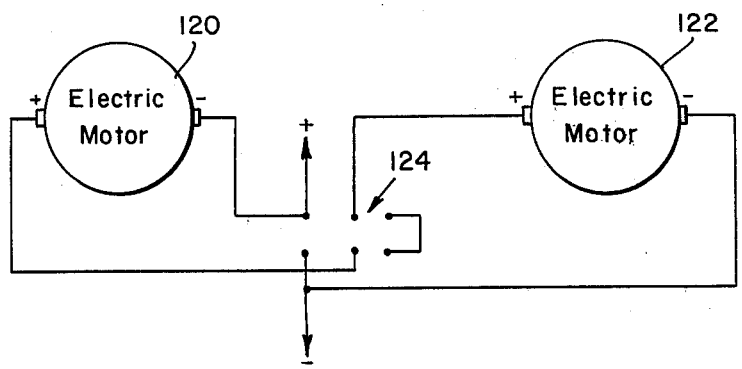
FIG. 7 is diagram of a multi-engine system for use in an airplane.

The airplane 10 and the control system described so far has been of the single engine variety. Under some circumstances it may be desirable to have multiple engines. FIG. 7 illustrates one form of such a multi-engine arrangement.

The two motors 120 and 122 are connected to a double throw-double pole switch 124 which is, in turn, connected to the battery pack 52. During a maximum power phase, for example, during take off and/or a high rate of climb, the switch 124 is moved to the left position. This connects the two motors 120 and 124 in parallel across the battery pack 52. This applies the full battery voltage to both motors 120 and 124 whereby they operate at their maximum power level.

During normal flight, the switch 124 is moved to the right position. This is effective to connect the two motors 120 and 122 in series across the battery pack 52. As a consequence, a considerably lower voltage is applied to the individual motors. This, in turn, causes the motors 120 and 122 to run slower and consume less power.

It should be noted the switch 124 may be operated by a separate control channel or it may be operated by moving one of the controls such as the rudder 24 to one of its extreme positions. It should also be noted that the switch may be connected directly to the battery or it may be connected to a throttle control system similar to that described above. In addition, if desired, a separate throttle control may be provided for each of the multiple motors. This allows individual control over the motors whereby they can be synchronized and/or used for steering, etc.

What is claimed is:
1. In an aircraft the combination of
a fuselage,
wings on said fuselage,
a rudder and a stabilizer on said fuselage,
movable control surfaces on said rudder and on said stabilizer for controlling the flight path of said aircraft,
an electric motor in said aircraft,
a propeller coupled to said motor and driven thereby, said propeller being disposed in the atmosphere and effective to propel said aircraft through the atmosphere,
a battery pack in said aircraft coupled to said motor for supplying electric power to said motor,
a radio receiver on said aircraft for receiving command signals from a remotely located radio transmitter,
control means interconnected with said radio receiver and responsive to the command signals from said radio transmitter, said control means being coupled to said movable control surfaces for positioning said control surfaces according to said command signals,
a switch coupled to said motor for turning said motor "ON" and "OFF", means interconnecting said switch to said control means, said last means being responsive to the position of one of said control surfaces for turning said switch "OFF" and stopping said motor when said control surface is moved into a preselected position, a voltage dividing and regulating circuit coupled to said battery pack, a first portion in said circuit, a second portion in said circuit, at least one Zenner diode in said first portion of said circuit for providing at least one regulated voltage, means connecting said receiver to the Zenner diode in said first portion for supplying the regulated voltage thereto, means connecting said motor to said second portion whereby both said receiver and said motor receive their power from said battery pack, a ventilation passage, and an entrance to said passage, said entrance being open to the atmosphere and positioned in the direct blast from the propeller, said ventilation passage extending through said casing and into and around the armature whereby the blast from the propeller is directed into direct and intimate heat exchanging relation with the rotating armature.

2. The combination of an aircraft, an electric motor mounted on said aircraft, an outer casing on said motor secured to said aircraft, an armature in said motor rotatably disposed inside of said casing, a propeller connected to said armature and driven thereby for propelling said aircraft through the atmosphere, said propeller being adapted to freewheel when said motor is turned "OFF" and said aircraft is gliding, a ventilation passage extending through said casing and into and around the armature, an entrance to said passage open to the atmosphere, an enlarged scoop on the entrance to said passage positioned behind the propeller and in the direct blast of air therefrom whereby the blast from the propeller directs a flow of air through said passage and into direct and intimate heat exchanging relation with the rotating armature, and a battery pack on said aircraft operatively connected to said motor for supplying electrical power to drive the motor, said battery pack being disposed in said ventilation passage whereby the flow of air through the passage passes into direct and intimate heat exchanging relation with the battery pack after it has passed through the motor.

3. The combination of an aircraft, an electric motor mounted on said aircraft, an outer casing on said motor secured to said aircraft, an armature in said motor rotatably disposed inside of the casing, a battery pack mounted on said aircraft and operatively connected to the motor for supplying electric power to drive the motor, a propeller connected to said armature and driven thereby for propelling said aircraft through the atmosphere, intake scoop means mounted on said aircraft and positioned behind the propeller in the blast of air from the propeller for diverting a flow of air into the scoop, ventilation passage means having the entrance thereof connected to said intake scoop means and the outlet thereof opening into the atmosphere whereby the blast of air from the propeller causes a forced draft of air to flow through the passage and discharge into the atmosphere, a portion of said ventilation passage means extending through said casing and into and around the armature whereby the flow of air from the blast from the propeller directs a flow of air through said passage and into direct and intimate heat exchanging relation with the rotating armature, and a portion of said ventilation passage means extending around said battery pack whereby the flow of air from the blast from the propeller directs a flow of air through said passage and into direct heat exchanging relation with the battery pack.

4. The combination of claim 3 including a radio receiver on said aircraft for receiving command signals from a remotely located radio transmitter, and control means on said aircraft interconnected with said radio receiver and responsive to the command signals for controlling the operation of said aircraft in response to the command signals.

5. The combination of claim 4 including a voltage dividing and regulating circuit coupled to said battery pack, a first portion in said circuit, a second portion in said circuit, at least one Zenner diode in said first portion of said circuit for providing at least one regulated voltage, means connecting said radio receiver to the Zenner diode in said first portion for supplying the regulated voltage thereto, and means connecting said motor to said second portion whereby both said radio receiver and said motor receives their power from said battery pack.

6. The combination of claim 4 including an operative payload carried on said aircraft, and means coupling said payload to said battery pack whereby the payload receives its power from said battery pack, said last means coupling said payload to said radio receiver so that the payload is operated in response to said command signals.

7. The combination of claim 4 including a fixed, rigid wing on said aircraft, a rudder and a stabilizer on said aircraft, a movable control surfaces on said rudder and stabilizer for controlling the flight path of said aircraft, said control means being interconnected with said movable control surfaces for positioning said control surfaces in response to said command signals.

8. The combination of claim 3 including a throttle control on said aircraft connected to said receiver and to said motor, said throttle control being effective to regulate the speed of the motor in response to a throttle command signal from the transmitter.

9. The combination of claim 8 wherein said electric motor has ball bearings whereby the friction torque on said motor is less than the torque produced by the propeller wind-milling when the aircraft is gliding.

10. The combination of claim 8 including means for electrically "shorting-out" said electric motor when said motor is not being driven by said battery pack to electrically increase the torque required to turn the motor.

11. The combination of an aircraft, an electric motor mounted on said aircraft, an outer casing on said motor secured to said aircraft, an armature in said motor rotatably disposed inside of the casing, a battery pack mounted on said aircraft and operatively connected to the motor for supplying electric power to drive the motor, a propeller connected to said armature and driven thereby for propelling said aircraft through the atmosphere, intake scoop means mounted on said aircraft and positioned behind the propeller in the blast of air from the propeller for diverting a flow of air into the scoop, ventilation passage means having the entrance thereof connected to said intake scoop means and the outlet thereof opening into the atmosphere whereby the blast of air from the propeller causes a forced draft of air to flow through the passage and discharge into the atmosphere, a portion of said ventilation passage means extending through said casing and into and around the armature whereby the flow of air from the blast from the propeller directs a flow of air through said passage and into direct and intimate heat exchanging relation with the rotating armature, a portion of said ventilation passage means extending around said battery pack whereby the flow of air from the blast from the propeller directs a flow of air through said passage and into direct heat exchanging relation with the battery pack, a radio receiver on said aircraft for receiving command signals from a remotely located radio transmitter, control means on said aircraft interconnected with said radio receiver and responsive to the command signals for controlling the operation of said aircraft in response to the command signals, a fixed, rigid wing on said aircraft, a rudder and a stabilizer on said aircraft, a movable control surfaces on said rudder and stabilizer for controlling the flight path of said aircraft, said control means being interconnected with said movable control surfaces for positioning said control surfaces in response to said command signals, an "ON/OFF" switch coupled to the electric motor for turning the motor "ON" and "OFF", and said switch being operatively interconnected to be responsive to the position of at least one of said control surfaces for turning said switch "OFF" and stop said motor when said control surface is moved into a preselected position.

12. The combination of an aircraft, an electric motor mounted on said aircraft, an outer casing on said motor secured to said aircraft, an armature in said motor rotatably disposed inside of the casing, a battery pack mounted on said aircraft and operatively connected to the motor for supplying electric power to drive the motor, a propeller connected to said armature and driven thereby for propelling said aircraft through the atmosphere, intake scoop means mounted on said aircraft and positioned behind the propeller in the blast of air from the propeller for diverting a flow of air into the scoop, ventilation passage means having the entrance thereof connected to said intake scoop means and the outlet thereof opening into the atmosphere whereby the blast of air from the propeller causes a forced draft of air to flow through the passage and discharge into the atmosphere, a portion of said ventilation passage means extending through said casing and into and around the armature whereby the flow of air from the blast from the propeller directs a flow of air through said passage and into direct and intimate heat exchanging relation with the rotating armature.

a portion of said ventilation passage means extending around said battery pack whereby the flow of air from the blast from the propeller directs a flow of air through said passage and into direct heat exchanging relation with the battery pack, a throttle control on said aircraft connected to said receiver and to said motor, said throttle control being effective to regulate the speed of the motor in response to a throttle command signal from the transmitter, said throttle command signal is a pulse having a magnitude which is a function of the desired speed of said motor, and pulse responsive means in said throttle control, said pulse responsive means being responsive to the magnitude of said pulse for modulating the amount of battery power coupled to said motor in response to the magnitude of the pulse.

13. The combination of an aircraft, an electric motor mounted on said aircraft, an outer casing on said motor secured to said aircraft, an armature in said motor rotatably disposed inside of the casing, a battery pack mounted on said aircraft and operatively connected to the motor for supplying electric power to drive the motor, a propeller connected to said armature and driven thereby for propelling said aircraft through the atmosphere, intake scoop means mounted on said aircraft and positioned behind the propeller in the blast of air from the propeller for diverting a flow of air into the scoop, ventilation passage means having the entrance thereof connected to said intake scoop means and the outlet thereof opening into the atmosphere whereby the blast of air from the propeller causes a forced draft of air to flow through the passage and discharge into the atmosphere, a portion of said ventilation passage means extending through said casing and into and around the armature whereby the flow of air from the blast from the propeller directs a flow of air through said passage and into direct and intimate heat exchanging relation with the rotating armature, a portion of said ventilation passage means extending around said battery pack whereby the flow of air from the blast from the propeller directs a flow of air through said passage and into direct heat exchanging relation with the battery pack, a throttle control on said aircraft connected to said receiver and to said motor, said throttle control being effective to regulate the speed of the motor in response to a throttle command signal from the transmitter, and said electric motor is reversible and may be run in either direction, said control means being effective to cause said motor to run in the forward direction whereby said propeller may be used for propelling said aircraft through the atmosphere and to cause said motor to run in the reverse direction whereby said propeller may be used for braking the aircraft.

* * * * *